United States Patent
Kim et al.

(10) Patent No.: US 12,482,230 B2
(45) Date of Patent: Nov. 25, 2025

(54) APPARATUS AND METHOD FOR DETECTING AN OBJECT AND A COMPUTER READABLE RECORDING MEDIUM THEREFOR

(71) Applicants: HYUNDAI MOTOR COMPANY, Seoul (KR); KIA CORPORATION, Seoul (KR); Korea University Research and Business Foundation, Seoul (KR)

(72) Inventors: Young Hyun Kim, Seoul (KR); Seo Won Lee, Seoul (KR); Jin Kyu Kim, Seoul (KR); Sang Pil Kim, Seoul (KR); Won Seok Roh, Seoul (KR)

(73) Assignees: HYUNDAI MOTOR COMPANY, Seoul (KR); KIA CORPORATION, Seoul (KR); Korea University Research and Business Foundation, Seoul (KR)

( * ) Notice: Subject to any disclaimer, the term of this patent is extended or adjusted under 35 U.S.C. 154(b) by 350 days.

(21) Appl. No.: 18/217,904

(22) Filed: Jul. 3, 2023

(65) Prior Publication Data

US 2024/0233326 A1    Jul. 11, 2024

(30) Foreign Application Priority Data

Jan. 10, 2023    (KR) .................. 10-2023-0003614

(51) Int. Cl.
*G06V 10/764*    (2022.01)
*G06N 3/094*    (2023.01)
(Continued)

(52) U.S. Cl.
CPC .......... *G06V 10/764* (2022.01); *G06N 3/094* (2023.01); *G06V 10/82* (2022.01); *G06V 20/56* (2022.01)

(58) Field of Classification Search
CPC ...... G06N 3/045; G06N 3/094; G06V 10/764; G06V 10/82; G06V 20/56; G06V 10/00;
(Continued)

(56) References Cited

U.S. PATENT DOCUMENTS 10,511,769 B2    12/2019    Edpalm et al.
2007/0291130 A1*    12/2007    Broggi .................. H04N 23/90
                                                          348/E13.015
(Continued)

FOREIGN PATENT DOCUMENTS

| EP | 3404913 A1 | 11/2018 |
| KR | 101699014 B1 | 1/2017 |
| KR | 102261323 B1 | 6/2021 |

OTHER PUBLICATIONS

Tsun-Hsuan Wang et al. , "3D LiDAR and Stereo Fusion using Stereo Matching Network with Conditional Cost Volume Normalization," Jan. 28, 2020, 2019 IEEE/RSJ International Conference on Intelligent Robots and Systems (IROS) Macau, China, Nov. 4-8, 2019, pp. 5896-5899.*
(Continued)

*Primary Examiner* — Omar S Ismail
(74) *Attorney, Agent, or Firm* — Lempia Summerfield Katz LLC

(57) ABSTRACT

An apparatus and method for detecting an object and a computer readable recording medium therefor are disclosed. The apparatus includes: a first camera that obtains a first image of a first view angle range; a second camera that obtains a second image of a second view angle range having an overlapping region with the first view angle range; an object detection network that detects an object in the first and second images; a stereo matching device that corrects a deviation of a depth value between the first and second images in the overlapping region based on a feature value output by a backbone network of the object detection (Continued)

3D OBJECT DETECTION network; and a feature vector determination device that performs adversarial learning to reduce a deviation of a feature vector between objects in the overlapping region and a non-overlapping region while the object detection network detects the object.

20 Claims, 14 Drawing Sheets

(51) Int. Cl.
*G06V 10/82* (2022.01)
*G06V 20/56* (2022.01)

(58) Field of Classification Search
CPC ........ G06V 20/00; G06V 30/00; G06V 40/00; G06V 2201/00
See application file for complete search history.

(56) References Cited

U.S. PATENT DOCUMENTS

| | | | |
|---|---|---|---|
| 2008/0199069 A1* | 8/2008 | Schick | H04N 13/257 382/154 |
| 2011/0118608 A1* | 5/2011 | Lindner | A61B 5/015 600/474 |
| 2011/0216208 A1* | 9/2011 | Matsuzawa | H04N 23/66 348/222.1 |
| 2014/0211989 A1* | 7/2014 | Ding | G06V 10/757 382/103 |
| 2015/0009149 A1* | 1/2015 | Gharib | G06F 3/011 345/156 |
| 2015/0054958 A1* | 2/2015 | Kim | G06V 20/56 348/149 |
| 2017/0019655 A1* | 1/2017 | Mueller | H04N 13/221 |
| 2018/0338084 A1 | 11/2018 | Edpalm et al. | |
| 2020/0029023 A1 | 1/2020 | Wippermann et al. | |
| 2020/0334860 A1* | 10/2020 | Hsieh | H04N 13/239 |
| 2020/0336655 A1* | 10/2020 | Hsieh | H04N 23/11 |
| 2020/0336729 A1* | 10/2020 | Hsieh | H04N 23/80 |
| 2021/0101791 A1* | 4/2021 | Ishizaki | G06V 40/10 |
| 2021/0110180 A1 | 4/2021 | Wang et al. | |
| 2021/0352259 A1* | 11/2021 | Jiang | H04N 17/002 |

OTHER PUBLICATIONS

Hamid Laga et al.,"A Survey on Deep Learning Techniques for Stereo-Based Depth Estimation," Mar. 4, 2022, IEEE Transactions on Pattern Analysis and Machine Intelligence, vol. 44, No. 4, Apr. 2022,pp. 1738-1759.*

Weiqin Chuah et al.,"Deep Learning-Based Incorporation of Planar Constraints for Robust Stereo Depth Estimation in Autonomous Vehicle Applications," Jul. 8, 2022, IEEE Transactions on Intelligent Transportation Systems, vol. 23, No. 7, Jul. 2022,pp. 6654-6663.*

Jinshan Liu et al.,""Seeing is Not Always Believing": Detecting Perception Error Attacks Against Autonomous Vehicles," Sep. 1, 2021, IEEE Transactions on Dependable and Secure Computing, vol. 18, No. 5, Sep./Oct. 2021, pp. 2209-2218.*

Yilun Chen et al.,"DSGN: Deep Stereo Geometry Network for 3D Object Detection," Jun. 2020, Proceedings of the IEEE/CVF Conference on Computer Vision and Pattern Recognition (CVPR), 2020, pp. 12536-12543.*

Jia-Ren Chang et al.,"Pyramid Stereo Matching Network," Jun. 2018, Proceedings of the IEEE Conference on Computer Vision and Pattern Recognition (CVPR), 2018, pp. 5410-5412.*

Yuxuan Liu et al.,"YOLOStereo3D: A Step Back to 2D for Efficient Stereo 3D Detection," Oct. 18, 2021, 2021 IEEE International Conference on 1Robotics and Automation (ICRA 2021),May 31-Jun. 4, 2021, Xi'an, China,pp. 13018-13023.*

Yue Wang et al.,"DETR3D: 3D Object Detection from Multi-view Images via 3D-to-2D Queries," Sep. 13, 2021, Proceedings of the 5th Conference on Robot Learning,pp. 1-5.*

Tai Wang et al.,"Probabilistic and Geometric Depth: Detecting Objects in Perspective," Jul. 2021, Proceedings of the 5th Conference on Robot Learning, PMLR 164, pp. 1-5.*

Wonseok Roh et al., ORA3D: Overlap Region Aware Multi-view 3D Object Detection, Jul. 2, 2022, URL: [2207.00865] ORA3D: Overlap Region Aware Multi-view 3D Object Detection (arxiv.org); 14 pp.

Wonseok Roh et al., ORA3D_Overlap Region Aware Multi-view 3D Object Detection, The 33rd British Machine Vision Conference 2022; Nov. 21, 2022; 19 pp.

* cited by examiner

APPARATUS AND METHOD FOR DETECTING AN OBJECT AND A COMPUTER READABLE RECORDING MEDIUM THEREFOR

CROSS-REFERENCE TO RELATED APPLICATION

This application claims the benefit of priority to Korean Patent Application No. 10-2023-0003614, filed in the Korean Intellectual Property Office on Jan. 10, 2023, the entire contents of which are incorporated herein by reference.

TECHNICAL FIELD

The present disclosure relates to an apparatus and method for detecting an object, and to a computer readable recording medium therefor, and more particularly, to a technique capable of improving object detection performance outside a vehicle.

BACKGROUND

An autonomous vehicle refers to a vehicle in which some or all operations for controlling driving are performed by a system in the vehicle instead of a human. An autonomous vehicle in a broad sense may include an advanced driver assistance system (ADAS).

An autonomous driving system is required to grasp a surrounding situation as well as a road in order to control driving. To accomplish this, a procedure for recognizing objects around the vehicle is essential.

Among schemes of identifying an object around a vehicle, a scheme of using a plurality of stereo cameras to obtain a depth using a disparity of each camera, thereby obtaining an object using the depth may be used.

While an object is detected by using a stereo camera, depth information of the same object present in an overlapping region of images acquired by two cameras must match. However, depth information obtained by each camera for the same object may be different. Thus, object detection accuracy may be degraded.

In addition, in an overlapping region, a feature vector of an object tends to be biased due to a deviation of pixel data of adjacent images. Thus, object detection accuracy may also be degraded.

SUMMARY

The present disclosure has been made to solve the above-mentioned problems occurring in the prior art while advantages achieved by the prior art are maintained intact.

An aspect of the present disclosure provides an apparatus and a method for detecting an object capable of improving a deviation of depth values between adjacent images in an overlapping region of images obtained by different cameras. Another object of the present disclosure provides a computer readable recording medium therefor.

Another aspect of the present disclosure provides an apparatus and a method for detecting an object capable of reducing a deviation between feature vectors of an object existing in an overlapping region and an object existing in a non-overlapping region. Another object of the present disclosure provides a computer readable recording medium therefor.

Another aspect of the present disclosure provides an apparatus and a method for detecting an object capable of improving an object detection speed. Another object of the present disclosure provides a computer readable recording medium therefor.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an apparatus for detecting an object includes: a first camera that obtains a first image of a first view angle range; a second camera that obtains a second image of a second view angle range having an overlapping region with the first view angle range; an object detection network that detects an object in the first image and the second image; a stereo matching device that corrects a deviation of a depth value between the first image and the second image in the overlapping region based on a feature value output by a backbone network of the object detection network; and a feature vector determination device that performs adversarial learning to reduce a deviation of a feature vector between an object in the overlapping region and an object in a non-overlapping region while the object detection network detects the object.

According to an embodiment, the stereo matching device may correct the deviation of the depth value by reducing a deviation between a predicted disparity map and a ground truth disparity map in the overlapping region.

According to an embodiment, the stereo matching device may: generate a matched feature value by matching a first image feature value of the first image and a second image feature value of the second image output by the backbone network of the object detection network; obtain multi-scale feature values for the matched feature value by using a multi-scale layer; and generate a cost volume based on the multi-scale feature values.

According to an embodiment, the stereo matching device may obtain a stereo focus loss corresponding to a deviation between the cost volume and the ground truth disparity map. The object detection network may learn an object detection model to reduce the stereo focus loss.

According to an embodiment, the feature vector determination device may output a regional classification loss proportional to a deviation of the feature vector based on the feature vector provided by the object detection network.

According to an embodiment, the object detection network may include: a transformer that outputs prediction location information and score information of the object based on the feature value output from the backbone network; and a class classifier that outputs a bounding box loss and a class loss based on the prediction location information, the score information, and the regional classification loss.

According to an embodiment, the object detection network may perform learning to reduce the regional classification loss output from the feature vector determination device.

According to an embodiment, the object detection network may perform the learning to reduce a total loss obtained by subtracting the regional classification loss from a sum of the bounding box loss, the class loss, and the stereo focus loss.

According to another aspect of the present disclosure, a method of detecting an object includes: extracting an overlapping region between a first image captured by a first camera and a second image captured by a second camera;

correcting, by a stereo matching device, a deviation of a depth value between the first image and the second image in the overlapping region while an object is detected in the first image and the second image by using an object detection network; and performing, by a feature vector determination device, adversarial learning to reduce a feature vector deviation between objects in the overlapping region and a non-overlapping region.

According to an embodiment, correcting the deviation of the depth value may include obtaining a predicted disparity map in the overlapping region and reducing a deviation between the predicted disparity map and a ground truth disparity map.

According to an embodiment, obtaining the predicted disparity map may include: generating a matched feature value by matching a first image feature value of the first image and a second image feature value of the second image output from a backbone network of the object detection network; obtaining multi-scale feature values for the matched feature value by using a multi-scale layer; and generating a cost volume based on the multi-scale feature values.

According to an embodiment, correcting the depth value may further include obtaining a stereo focus loss corresponding to a deviation between the cost volume and the ground truth disparity map and learning an object detection model to reduce the stereo focus loss.

According to an embodiment, performing the adversarial learning may include outputting a regional classification loss proportional to a deviation of the feature vector based on the feature vector provided by the object detection network.

According to an embodiment, performing the adversarial learning may further include providing, by a network, the regional classification loss to a class classifier that outputs a bounding box loss and a class loss.

According to an embodiment, performing the adversarial learning may further include learning the object detection network to reduce the regional classification loss.

According to an embodiment, extracting the overlapping region may include obtaining 4D information including the depth value based on 2D information extracted from the first image and the second image.

According to still another aspect of the present disclosure, a computer readable recording medium stores computer readable instructions for performing operations. The operations include: extracting an overlapping region between a first image captured by a first camera and a second image captured by a second camera; correcting a deviation of a depth value between the first image and the second image in the overlapping region; and performing adversarial learning to reduce a deviation of a feature vector between an object in the overlapping region and an object in a non-overlapping region while an object is detected in the first image and the second image by using an object detection network.

According to an embodiment, correcting the deviation of the depth value may include obtaining, by a backbone network of the object detection network, a predicted disparity map based on a feature value, and obtaining a stereo focus loss based on a deviation between the predicted disparity map and a ground truth disparity map.

According to an embodiment, correcting the depth value may further include learning an object detection model to reduce the stereo focus loss.

According to an embodiment, performing the adversarial learning may include: outputting, by a feature vector determination device, a regional classification loss proportional to a deviation of the feature vector based on the feature vector provided by the object detection network; and learning the object detection network to reduce the regional classification loss.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
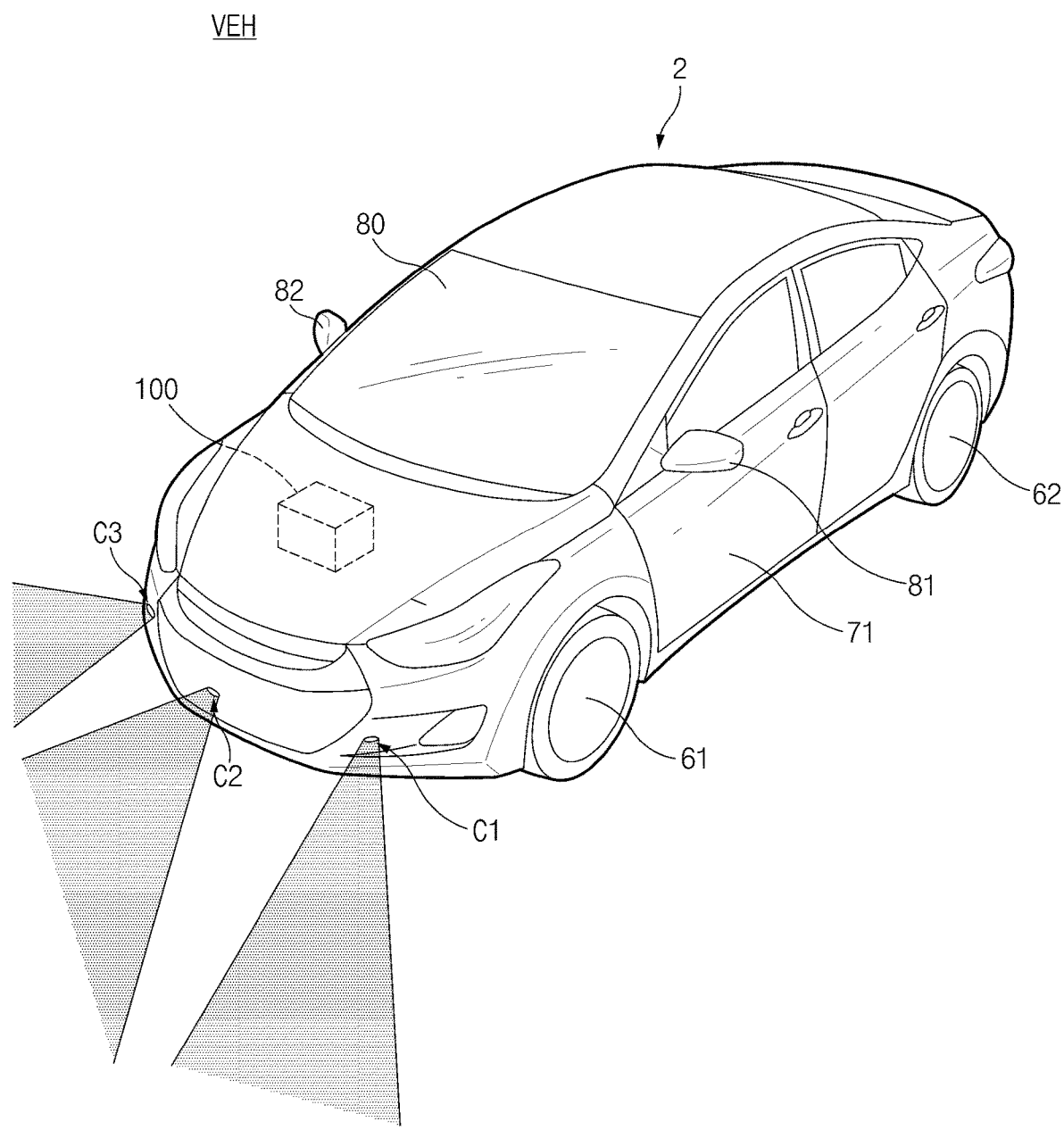
FIG. 1 is a diagram illustrating a vehicle including an object detection model according to an embodiment of the present disclosure.

Hereinafter, some embodiments of the present disclosure are described in detail with reference to the drawings. In adding the reference numerals to the components of each drawing, it should be noted that identical or equivalent components are designated by the identical numeral even when they are displayed on other drawings. Further, in describing the embodiments of the present disclosure, detailed descriptions of related known configurations or functions have been omitted where it has been determined that they would have interfered with understanding of the embodiments of the present disclosure.

In describing the components of an embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as should be commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like, of the present disclosure, is described as having a purpose or performing an operation, function, or the like, the component, device, or element should be considered herein as being "configured to" meet that purpose or to perform that operation or function.

Hereinafter, with reference to FIGS. 1-14, embodiments of the present disclosure are described in detail.

FIG. 1 is a diagram illustrating a vehicle including an object detection model according to an embodiment of the present disclosure. An object detection model according to an embodiment of the present disclosure may be installed in an autonomous vehicle and detect an object outside the vehicle. An autonomous vehicle according to an embodiment of the present disclosure may be a vehicle belonging to autonomous driving level 1 to autonomous driving level 5 and may include a vehicle using an advanced driver assistance system (ADAS).

Referring to FIG. 1, a vehicle VEH according to an embodiment of the present disclosure may include a main body 2, wheels 61 and 62, a door 71, a windshield 80, side mirrors 81 and 82, a sensor 10, and a processor 100.

The vehicle VEH may be an electrification-based vehicle such as an electric vehicle (EV), a hybrid electric vehicle (HEV), a plug-in hybrid electric vehicle (PHEV), a fuel cell electric vehicle (FCEV), or the like.

The main body 2 may be a structure constituting the outer appearance of the vehicle VEH.

The wheels 61 and 62 may include the front wheel 61 provided at the front of the vehicle and the rear wheel 62 provided at the rear of the vehicle. The front wheel 61 and the rear wheel 62 may be rotated by a driving device to move the vehicle VEH.

The door 71 may be rotatably provided on the left and right sides of the main body 2 such that occupants may enter the interior of the vehicle VEH when opened, and when closed, the interior of the vehicle VEH is shielded from the outside.

The windshield 80, which is a kind of windscreen, may be provided on the front upper side of the main body 2 to provide visibility information of the front of the vehicle VEH to a driver or user inside the vehicle VEH.

The side mirrors 81 and 82 may include the left side mirror 81 provided on the left side of the main body 2 and the right side mirror 82 provided on the right side of the main body 2. The side mirrors 81 and 82 may provide side and rear visual field information of the vehicle VEH to a driver inside the vehicle VEH.

The sensor 10 may include a camera 11, and a location where the camera 11 is arranged may not be limited to the location shown in FIG. 1.

The processor 100 may detect an object outside the vehicle by using an object detection model 200 according to an embodiment of the present disclosure.

Figure 2:
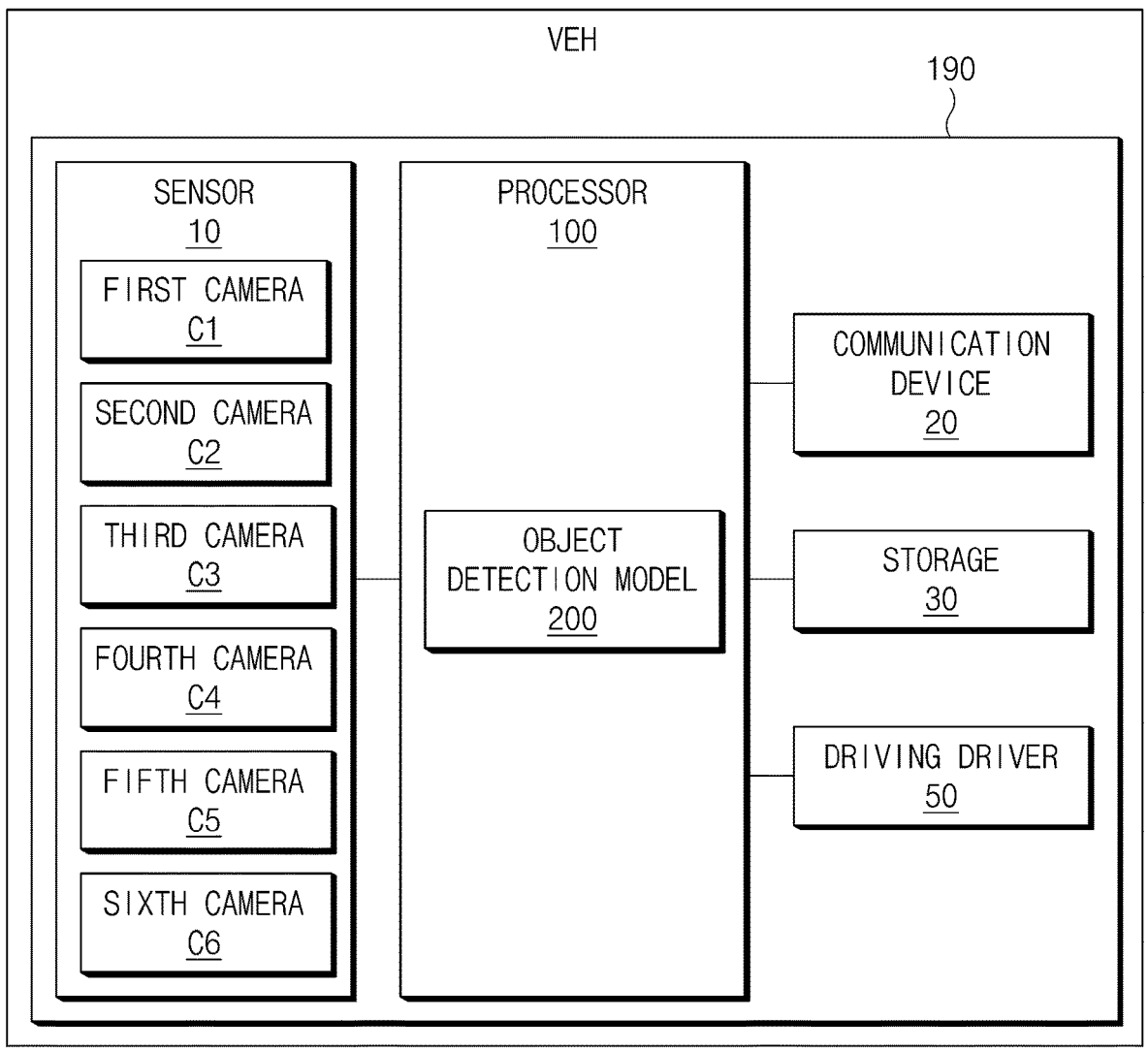
FIG. 2 is a block diagram illustrating the configuration of an autonomous driving control device including an object detection model according to an embodiment of the present disclosure.

FIG. 2 is a block diagram illustrating the configuration of an autonomous driving control device including an object detection model 200 according to an embodiment of the present disclosure. An autonomous driving control device 190 according to an embodiment of the present disclosure may be implemented inside a vehicle. In this case, the vehicle control device 190 may be formed integrally with internal control units of the vehicle. The vehicle control device 190 may be implemented as a separate device and connected to the control units of the vehicle by a separate connection unit.

Referring to FIG. 2, an autonomous driving control device including an object detection model 200 according to an embodiment of the present disclosure may include the sensor 10, a communication device 20, storage 30, the processor 100, and a driving control device, i.e., a driving driver 50.

The sensor 10 may include the camera 11 for detecting an object outside the vehicle, particularly vehicles located in front or rear of the vehicle.

The camera 11, which is provided to obtain an external image around a vehicle, may detect a 3D object based on depth information obtained using two or more cameras. A plurality of cameras adjacent to each other may be arranged such that the angles of view overlap at least partially with each other.

As shown in FIG. 1, a first camera C1 may obtain an image of the left front area of the vehicle, a second camera C2 may obtain an image of the front area of the vehicle, and a third camera C3 may obtain an image of the right front area of the vehicle.

Similarly, though not specifically shown, a fourth camera C4 may obtain an image of the right rear area, a fifth camera C5 may obtain an image of the rear area, and a sixth camera C6 may obtain an image of the left rear area at the rear of the vehicle.

In addition, the sensor 10 may include a light imaging detection and ranging (LIDAR), a radio detection and ranging (RADAR), an ultrasonic sensor, or an infrared sensor.

The lidar may include a laser transmission module and a reception module. The lidar may be implemented in a time-of-flight (TOF) scheme or a phase-shift scheme. The lidar may be exposed to the outside of the vehicle to detect an object located in front, rear, or side of the vehicle.

The radar may include an electromagnetic wave transmission module and a reception module. The radar may be implemented in a pulse radar scheme or a continuous wave radar scheme in terms of the radio wave emission principle. The radar may be implemented in a frequency modulated continuous wave (FMCW) scheme or a frequency shift keying (FSK) scheme according to a signal waveform among continuous wave radar schemes. The radar may detect an object based on a TOF schemed or a phase-shift scheme using electromagnetic waves as a medium, and may detect the location of the detected object, the distance to the detected object, and the relative speed.

The ultrasonic sensor may include an ultrasonic transmission module and a reception module. The ultrasonic sensor may detect an object based on ultrasonic waves, and may detect a location of the detected object, a distance to the detected object, and a relative speed. The ultrasonic sensor may be arranged at an appropriate location outside the vehicle to detect objects located in front, rear, or side of the vehicle.

The infrared sensor may include an infrared transmission module and a reception module. The infrared sensor may detect an object based on infrared light, and may detect a location of the detected object, a distance to the detected object, and a relative speed. The infrared sensor may be arranged outside the vehicle to detect objects located in front, rear, or side of the vehicle.

In addition, the sensor 10 may include a brake-pedal position sensor (BPS) and an accelerator pedal position sensor (APS) that generate a speed control command for shifting the speed of the vehicle.

The brake pedal position sensor may output a BPS signal according to the degree of depression of the brake pedal provided in the vehicle. For example, as the BPS signal, data of 0 to 100 may be output according to the depression of the brake pedal. A value of 0 may correspond to the case where the brake pedal is not pressed, and a value of 100 may correspond to the case where the brake pedal is fully depressed, i.e., pressed at the maximum.

The accelerator pedal position sensor may output an APS signal according to the degree of depression of the accelerator pedal provided in the vehicle. For example, as the APS signal, data of 0 to 100 may be output according to the depression of the accelerator pedal. A value of 0 may correspond to the case where the accelerator pedal is not pressed, and a value of 100 may correspond to the case where the accelerator pedal is fully depressed, i.e., pressed at the maximum.

The communication device 20 may perform communication with a user terminal, another vehicle, or an external server.

Short-range communication, global positioning system (GPS) signal reception, vehicle-to-everything (V2X) communication, optical communication, broadcast transmission/reception, and intelligent transport systems (ITS) communication functions may be performed.

The communication device 20 may support short-range communication by using at least one of Bluetooth™, radio frequency identification (RFID), infrared data association (IrDA), ultra-wideband (UWB), ZigBee, near field communication (NFC), and wireless universal serial bus (USB) technology.

The communication device 20 may include a global positioning system (GPS) module or a differential global positioning system (DGPS) module for obtaining location information.

In addition, the communication device 20 may include a V2X communication module. The V2X communication module may include a radio frequency (RF) circuit for a wireless communication protocol with a server (Vehicle to Infra: V2I), another vehicle (Vehicle to Vehicle: V2V), or a pedestrian (Vehicle to Pedestrian: V2P).

The communication device 20 may transmit and receive radio signals with at least one of a base station, an external terminal, and a center on a mobile communication network constructed according to technical standards or communication schemes for mobile communication. For example, the communication device 20 may perform communication based on global system for mobile communication (GSM), code division multi access (CDMA), code division multi access 2000 (CDMA2000), enhanced voice-data optimized or enhanced voice-data only (EV-DO), wideband CDMA (WCDMA), high-speed downlink packet access (HSDPA), high-speed uplink packet access (HSUPA), long term evolution (LTE), long term evolution-advanced (LTEA), and the like. The wireless signal may include a voice call signal, a video call signal, or various types of data according to text/multimedia message transmission/reception.

The storage 30 may store algorithms and object detection models for operation of the processor 100. The storage 30 may include a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

The processor 100 may detect an object based on images obtained through cameras. The processor 100 may include the object detection model 200 shown in FIG. 3.

The object detection model 200 may include a neural network designed to simulate a human brain structure on a computer in order to detect an object based on an image obtained through the camera 11. The neural network of the object detection model 200 may include a plurality of network nodes having weights simulating human neurons. A plurality of network nodes may transmit and receive data according to a respective connection relationship so as to simulate synaptic activity of neurons that transmit and receive signals through synapses. The neural network may include a deep learning model developed from a neural network model. In the deep learning model, a plurality of network nodes may exchange data according to a convolution connection relationship while being located in different layers. As an example of a neural network model, various deep learning schemes such as a deep neural network (DNN), a convolutional deep neural network (CNN), a recurrent Boltzmann machine (RNN), a restricted Boltzmann machine (RBM), a deep belief network, a deep Q-network, and the like may be included.

Hereinafter, an operation of detecting an object by the object detection model 200 according to an embodiment of the present disclosure may be understood as an operation of the processor 100.

In addition, the processor 100 may perform an autonomous driving or driving assistance function by controlling the driving control device, i.e., the driving driver 50 based on the detected object.

The driving driver 50 may operate a driving assistance function under the control of the processor 100 that detects an object.

A driving assistance function may include a forward collision warning function that detects a risk of collision with a front vehicle in advance and warns the driver. The driving assistance function may also include a forward collision avoidance assistance function that controls braking and steering of a vehicle in response to the risk of collision.

In addition, the driving assistance function may include: lane keeping assist (LKA); a lane departure warning system (or lane keeping assist system); blind-spot collision-avoidance assist (BCA); safety exit assist (SEA); intelligent speed limit assist (ISLA); smart cruise control (SCC); low beam assist; high beam assist; driver attention warning (DAW); blind-spot view monitor (BVM); highway driving assist (HDA); surround view monitor (SVM); remote smart parking assist (RSPA); and the like.

Figure 3:
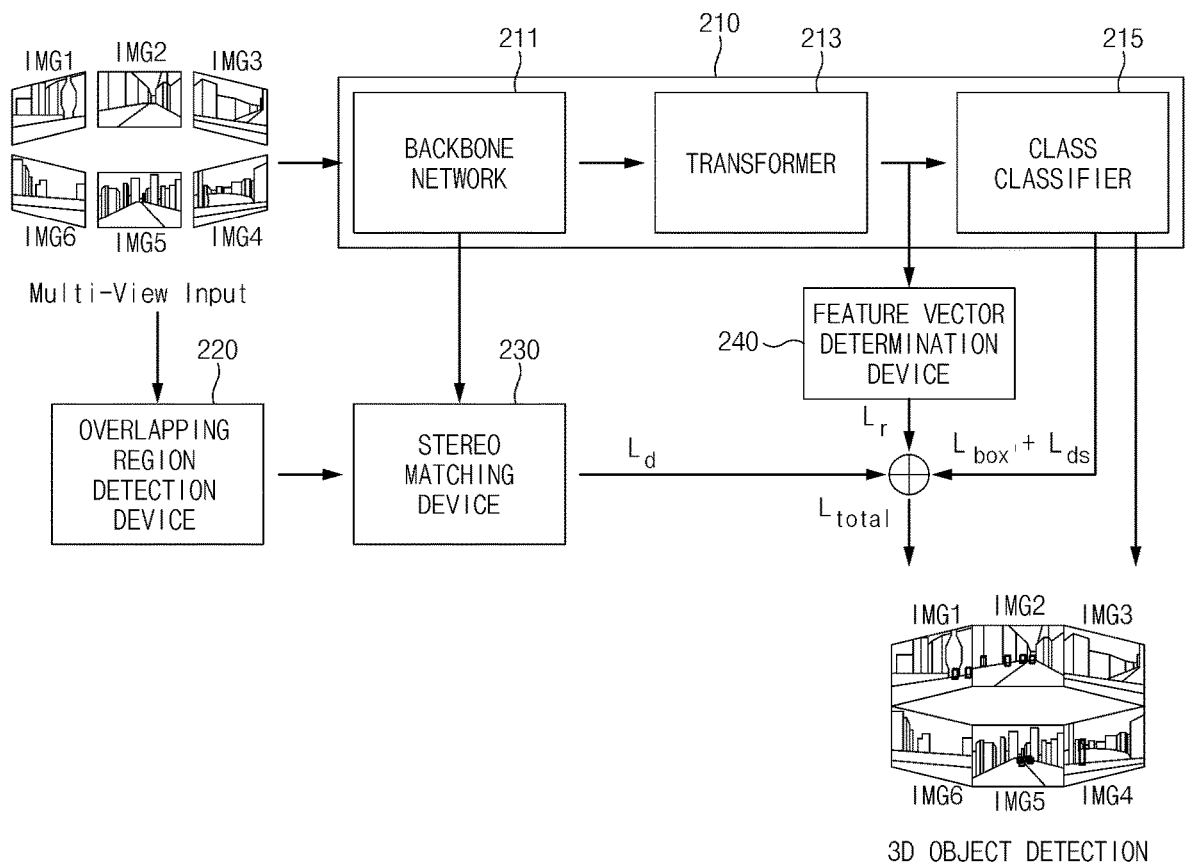
FIG. 3 is a diagram illustrating an object detection model according to an embodiment of the present disclosure.

FIG. 3 is a diagram illustrating an object detection model according to an embodiment of the present disclosure.

Referring to FIG. 3, an object detection model according to an embodiment of the present disclosure may include an object detection network 210, an overlapping region detection device 220, a stereo matching device 230, and a feature vector determination device 240.

The object detection network 210 may include a backbone network 211, a transformer 213, and a class classifier 215.

The backbone network 211 may extract a feature value based on an input image. The input image may include a first image IMG1 to a sixth image IMG6 obtained through the first camera C1 to the sixth camera C6.

The transformer 213 may include a transformer encoder that receives an input sequence and a transformer decoder that outputs an output sequence. The transformer 213 does not use an location information, score anchor box, and may output information, and feature vectors of an expected object based on the feature value provided from the backbone network 211. The location information may include coordinate information of an expected object. The score information may indicate accuracy or similarity of the expected object.

The class classifier 215 may classify objects and output the location and class of an object. In addition, the class classifier 215 may output a bounding box loss and a class loss.

The overlapping region detection device 220 may detect an overlapping region between adjacent images. The overlapping region detection device 220 may detect a first overlapping region between the first image IMG1 and the second image IMG2. In addition, the overlapping region detection device 220 may: detect a second overlapping region between the second image IMG2 and a third image IMG3; detect a third overlapping region between the third image IMG3 and a fourth image IMG4; detect a fourth overlapping region between the fourth image IMG4 and a fifth image IMG5; detect a fifth overlapping region between the fifth image IMG5 and a sixth image IMG6; and detect a sixth overlapping region between the sixth image IMG6 and the first image IMG1. In each image, an area other than the overlapping region may be defined as a non-overlapping region.

The stereo matching device 230 may correct a depth value deviation between images in each of the overlapping regions based on the feature value output from the object detection network 210. For example, the stereo matching device 230 may correct a deviation between the depth value of the first image IMG1 in a first overlapping region OV1 and the depth value of the second image IMG2 in the first overlapping region OV1.

The stereo matching device 230 may obtain a disparity map predicted in the overlapping region. The predicted disparity map may be generated based on the feature value output by the backbone network 211 of the object detection network 210. The stereo matching device 230 may generate a matched feature value by matching a first image feature value of the first image and a second image feature value of the second image. In addition, the stereo matching device 230 may obtain multi-scale feature values for the matched feature values by using the multi-scale layer and generate a cost volume based on the multi-scale feature values.

The stereo matching device 230 may obtain a stereo focus loss corresponding to a deviation between the cost volume and the ground truth disparity map.

The feature vector determination device 240 may reduce a feature vector deviation between an object detected in an overlapping region and an object detected in a non-overlapping region. The feature vector determination device 240 may output a regional classification loss proportional to the deviation between the feature vector of the object detected in the overlapping region and the feature vector detected in the non-overlapping region, based on the class information and location information provided from the object detection network 210. For example, the feature vector determination device 240 may determine the regional classification loss, which is set to a larger value as the deviation between the feature vector of the object detected in the overlapping region and the feature vector detected in the non-overlapping region increases. The regional classification loss may be used for learning of the object detection network 210 and the object detection network 210 may perform learning to reduce the regional classification loss. The feature vector determination device 240 may be implemented using a gradient reversal layer (GRL).

Figure 4:
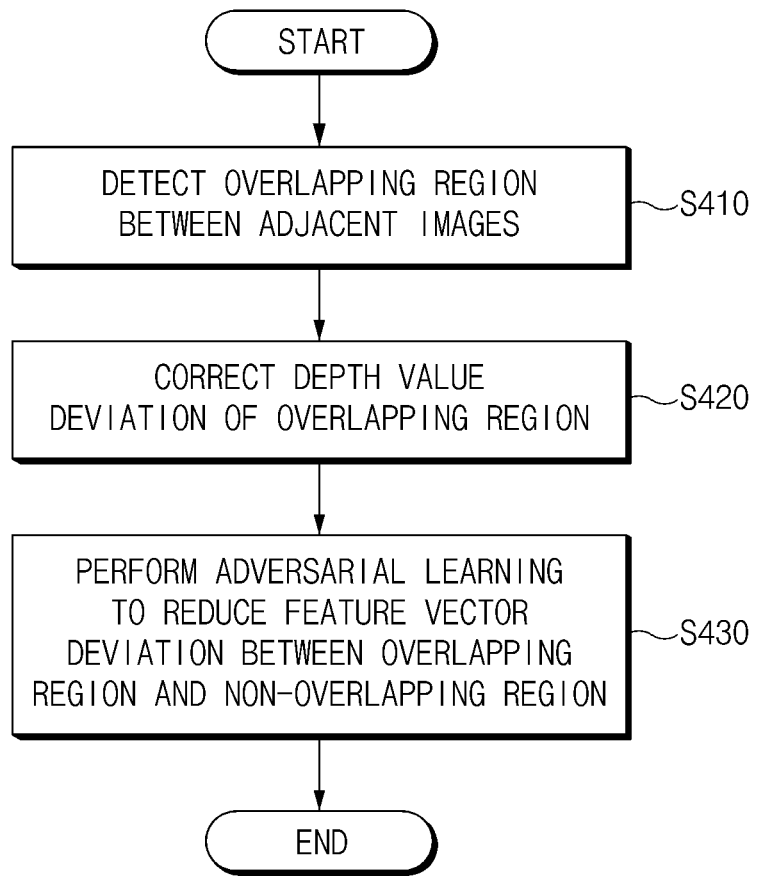
FIG. 4 is a flowchart illustrating a method of detecting an object according to an embodiment of the present disclosure.

FIG. 4 is a flowchart illustrating a method of detecting an object according to an embodiment of the present disclosure.

With reference to FIGS. 3 and 4, a method of detecting an object according to an embodiment of the present disclosure is described below.

In S410, the overlapping region detection device 220 may detect an overlapping region. The overlapping region detection device 220 may obtain the overlapping region between the first image obtained through the first camera C1 and the second image obtained through the second camera C2.

In S420, the stereo matching device 230 may correct the deviation between the depth values of the first image and the second image. The depth value deviation may be used in the process of detecting an object by the object detection network.

The stereo matching device 230 may output a stereo focus loss on which deviation information between the predicted disparity map and the ground truth disparity map is reflected. The predicted disparity map may be obtained through a cost volume. In order to obtain the cost volume, the stereo matching device 230 may match the first image feature value of the first image output from the backbone network 211 and the second image feature value of the second image to generate a matched feature value. In addition, the stereo matching device 230 may obtain multi-scale feature values for the matched feature value by using the multi-scale layer and may generate the cost volume by combining the multi-scale feature values.

The stereo matching device 230 may output a stereo focus loss corresponding to a deviation between the cost volume and the ground truth (GT) disparity map.

The stereo focus loss may be used in a process of learning the object detection network 210 and the object detection network 210 may perform learning to reduce the stereo focus loss.

In S430, the feature vector determination device 240 may perform adversarial learning to reduce the deviation between the feature vector of the object detected in the overlapping region and the feature vector of the object detected in the non-overlapping region.

The feature vector determination device 240 may receive class information, location information, and feature vectors from the transformer 213 of the object detection network 210. The feature vector determination device 240 may output a regional classification loss proportional to the deviation between the feature vector of an object detected in an overlapping region and the feature vector of an object detected in a non-overlapping region, based on the feature vector. The regional classification loss may be used for learning of the object detection network 210, and the object detection network 210 may perform learning to reduce the regional classification loss.

Hereinafter, a detailed operation of the method of detecting an object described with reference to FIGS. 3 and 4 is described.

Figure 5:
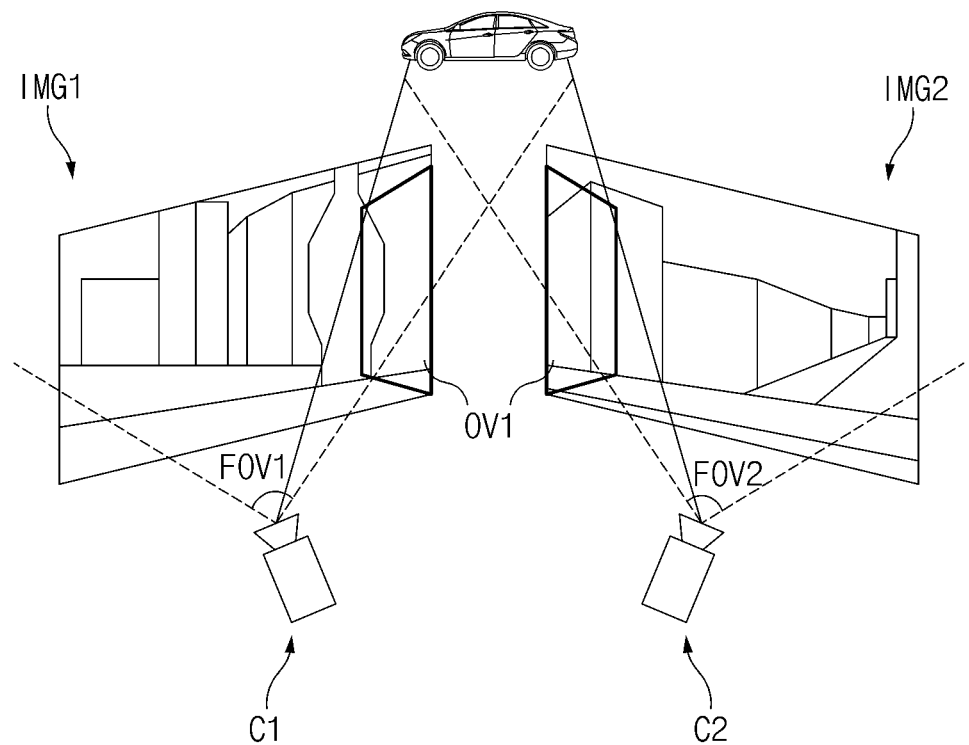
FIG. 5 is a diagram illustrating an operation of an overlapping region detection device.

FIG. 5 is a diagram illustrating an operation of an overlapping region detection device. FIG. 5 illustrates an example of detecting the overlapping region of the first camera C1 and the second camera C2.

Referring to FIG. 5, the first camera C1 and the second camera C2 may each obtain an image of the outside of the vehicle. The first image IMG1 obtained through the first camera C1 may be an image of the front left side of the vehicle, and the second image IMG2 obtained through the second camera C2 may be a front image of the vehicle. The first camera C1 may obtain an image within a first view angle FOV1, and the second camera C2 may obtain an image within a second view angle FOV2. The first image IMG1 and the second image IMG2 may include the first overlapping region OV1 where the first view angle FOV1 and the second view angle FOV2 overlap.

The processor 100 may detect the first overlapping region OV1 by using Equation 1 to Equation 5 below.

Two-dimensional (2D) coordinates of an area expected as the first overlapping region OV1 obtained through the second camera C2 may be expressed as X2Df=[u, v]. The processor 100 may obtain the three-dimensional (3D) coordinates X3Df by infinitely applying the depth value to the 2D coordinates of the first overlapping region OV1 as in Equation 1.

Equation 1

$$X3Di = [u \times d^\infty, v \times d^\infty, d^\infty]$$

The processor 100 may obtain the four-dimensional (4D) coordinates X4Df by concatenating '1' to the 3D coordinates X3Df as in Equation 2.

Equation 2

$$X4Df = X3Df \oplus 1$$

The processor 100 may convert 4D coordinates corresponding to camera coordinates to egocentric coordinates Xegof by multiplying 4D coordinates X4Df by a transformation matrix T as shown in Equation 3 below.

Equation 3

$$Xegof = T \cdot X4Df$$

The transformation matrix T may be T={Tf, Tfr, ..., Tbr} ∈ R4×4 in the form of 4×4.

The processor 100 may multiply the egocentric coordinates Xegof by an inverse matrix to convert the egocentric coordinates Xegof into first camera space coordinates, as shown in Equation 4 below.

Equation 4

$$X*4Dfl = T - 1fl \cdot Xegof$$

The processor 100 may project the coordinates of the second camera C2 to the coordinates of the first camera C1 by dividing the spatial coordinates of the first camera by a depth value dx of the pixel, as shown in Equation 5 below.

Equation 5

$$X4Dfl = X*4Dfl/dX$$

As described above, the processor 100 may extract an overlapping region between images of the first camera C1 and the second camera C2.

Figure 6:
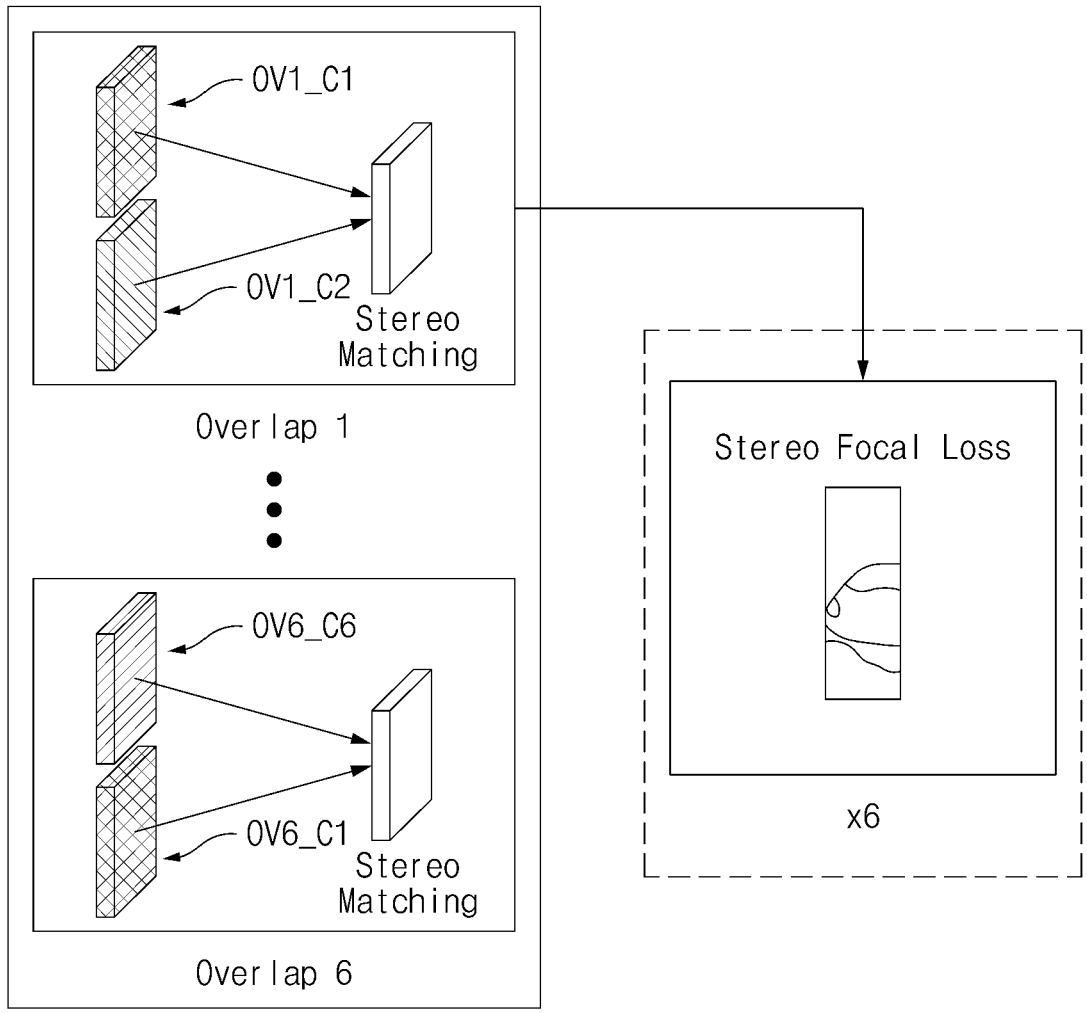
FIG. 6 is a diagram illustrating a stereo focus loss according to an embodiment of the present disclosure.
Figure 7:
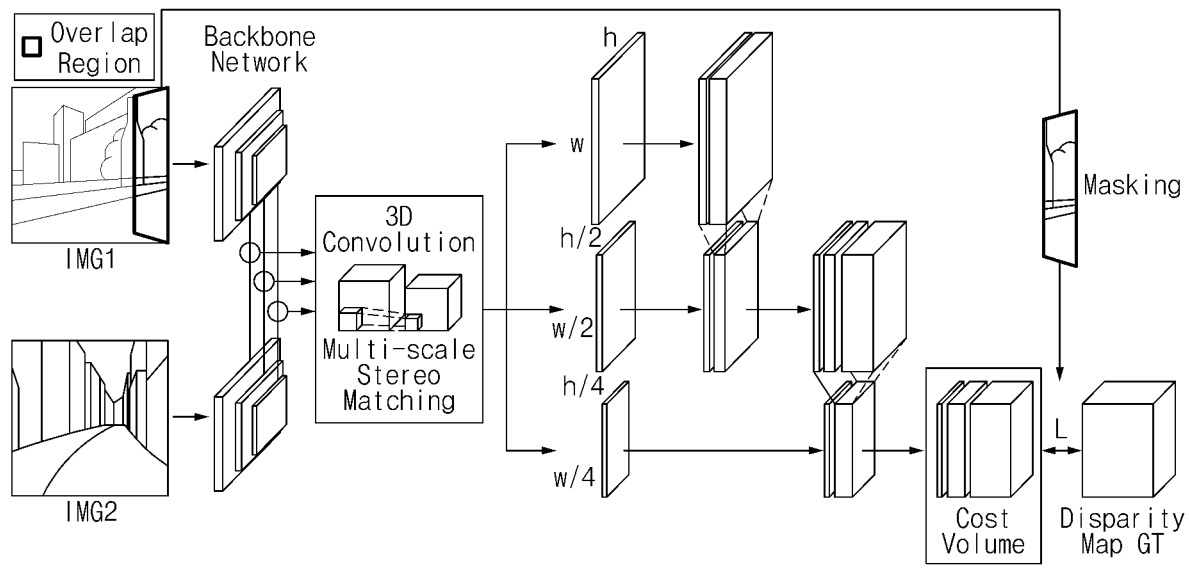
FIG. 7 is a diagram illustrating stereo matching according to an embodiment of the present disclosure.

FIG. 6 is a diagram illustrating a stereo focus loss according to an embodiment of the present disclosure. FIG. 7 is a diagram illustrating stereo matching according to an embodiment of the present disclosure.

Referring to FIG. 6, the processor 100 may perform stereo matching on the first overlapping region to the sixth overlapping region as described with reference to FIG. 5.

Referring to FIG. 7, the stereo matching part according to an embodiment of the present disclosure may calculate disparity based on a feature value output from the backbone network 211.

The backbone network 211 may be a model trained in advance for image classification and may extract a feature value. The backbone network 211 according to an embodiment may use a convolutional neural network (CNN) to generate a feature map based on an input image.

The images obtained by adjacent cameras may be provided to the backbone network 211. FIG. 7 illustrates that the first image IMG1 obtained through the first camera C1 and the second image IMG2 obtained through the second camera C2 are input to the backbone network 211.

The resolutions of the first image IMG1 and the second image IMG2 may be down-sampled by ¼ and input to layers of the backbone network. For example, when the resolutions of the first image IMG1 and the second image IMG2 are [B, C, H, W], an image having a resolution of W×H may be provided to the first layer, an image having a resolution of (W/2)×(H/2) may be provided to the second layer, and an image having a resolution of (W/4)×(H/4) may be provided to the third layer. As described above, each layer may extract feature values of different scales based on images having resolutions of different sizes.

The feature values of the overlapping region may be obtained in the form of tensors from the first camera C1 and the second camera C2.

The stereo matching device 230 may use the stereo focus loss to predict disparity.

The focal loss may improve a phenomenon in which accuracy of object detection is lowered due to class imbalance in a model implemented with a one-stage detector. The focal loss may give a higher weight to "Hard Positive" cases than to "Easy Negative" cases, such as a background.

The stereo focus loss may be expressed as the following Equation 6.

Equation 6

$$Ld = 1|P|\sum p \in PD - 1 \sum d = 0((1 - Pp(d))) - \alpha(-Pp(d)\log^\wedge Pp(d))$$

In Equation 6, 'd' may mean a predicted disparity, 'D' may mean a maximum disparity, 'a' may mean a focus weight, and Pp (d) may mean an expected disparity distribution of pixels in an overlapping region. In addition, Pp(d) may be an output value of softmax obtained based on the deviation between the predicted disparity and the ground truth disparity, as shown in Equation 7 below.

Equation 7

$$Pp(d) = \text{Softmax}(-2|d - dgt|)$$

In Equation 7, dgt may mean a ground truth disparity.

Figure 8:
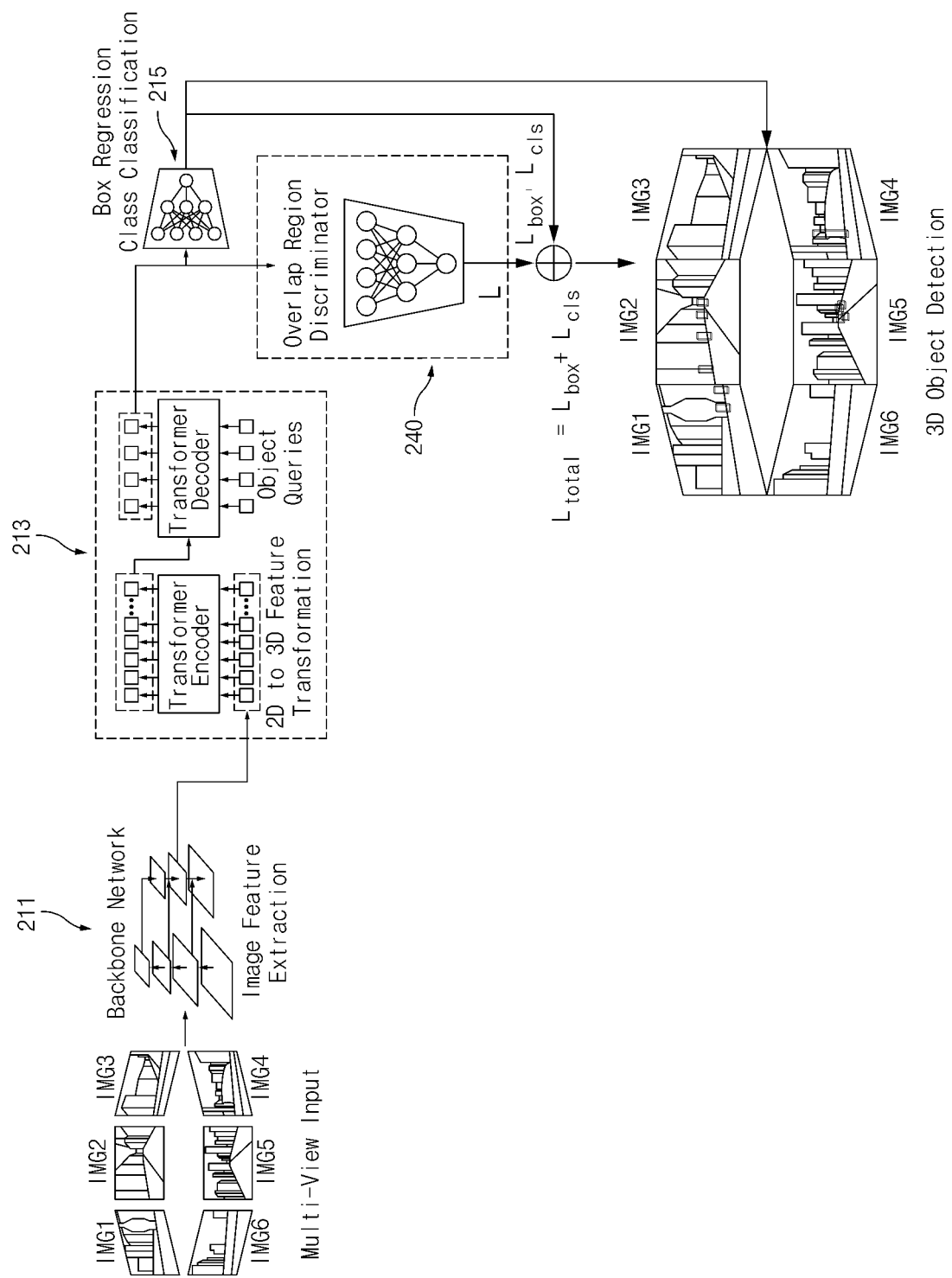
FIG. 8 is a diagram illustrating adversarial learning for an overlapping region.
Figure 9:
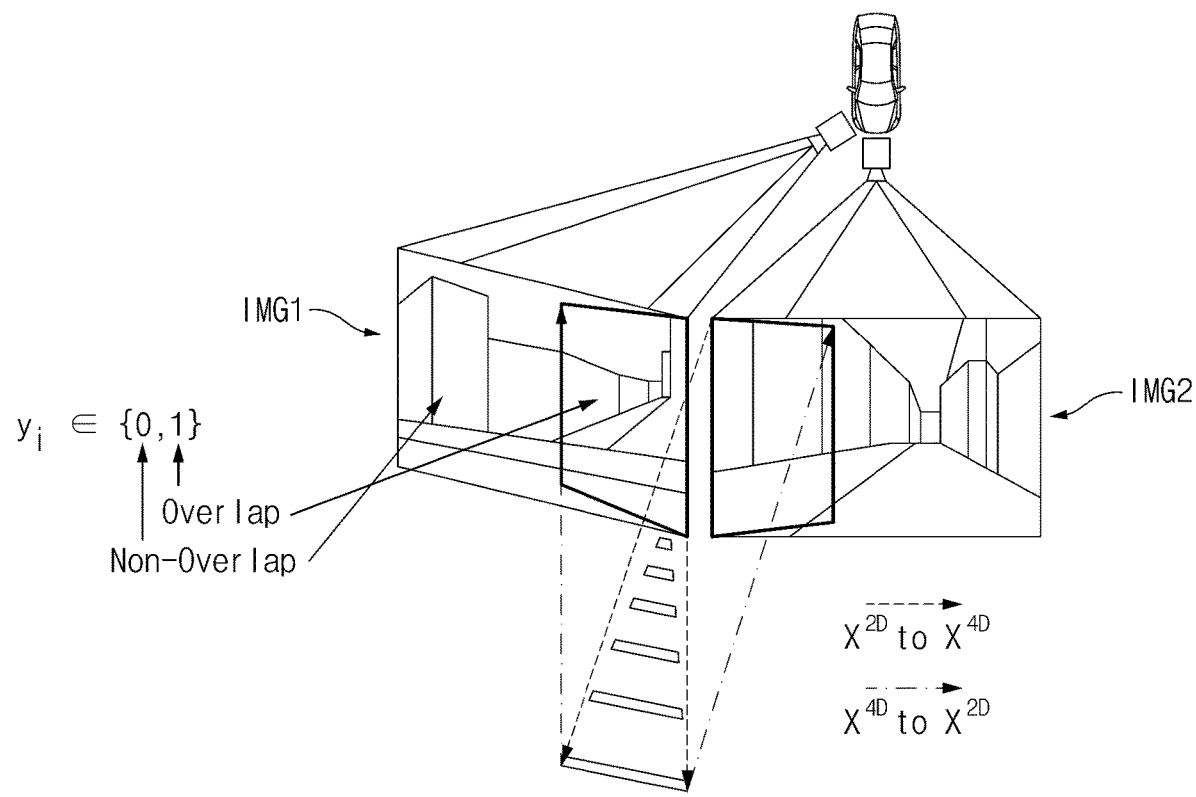
FIG. 9 is a diagram illustrating an input factor of a feature vector determination device.

FIG. 8 is a diagram illustrating adversarial learning for an overlapping region. FIG. 9 is a diagram illustrating an input factor of a feature vector determination device.

Referring to FIGS. 8 and 9, an object detection model according to an embodiment of the present disclosure may include the feature vector determination device 240.

The feature vector determination device 240 may suppress feature vectors of objects in the overlapping region and the non-overlapping region from expressing different feature values, such that the object detection process in the overlapping region may be performed under the same condition as the object detection process in the non-overlapping region.

The feature vector determination device 240 may be trained using a regional classification loss Lr, as shown in Equation 8 below.

Equation 8

$$Lr = -Eq, \text{yr}\sim Dd\left[\sum r \in Ryr\log f_d(q)r\right]$$

In Equation 8, fa may mean an output value of the feature vector determination device 240 and Eq, yr~D may mean an expected value for a sample extracted from the data distribution Dd of the input image. For example, 'q' may be a feature value output from the transformer 213.

In FIG. 9, yi may mean a location value of a feature vector and may be classified as '0' or '1'. For example, yl may mean a location value of a feature vector in the first image IMG1. In addition, yl may be determined as '1' in the overlapping region between the first image IMG1 and the second image IMG2, and yl may be determined as '0' in the overlapping region between the first image IMG1 and the second image IMG2.

The feature vector determination device 240 may be trained to classify the class according to whether the feature value output from the transformer 213 belongs to an overlapping region or a non-overlapping region.

In addition, the object detection network 210 may be trained to reduce the regional classification loss Lr.

As a result, the object detection network 210 according to an embodiment of the present disclosure may perform end-to-end learning such that a total loss Ltotal is minimized, as shown in following Equation 9.

Equation 9

$$Ltotal = \lambda cls Lcls + \lambda box Lbox + \lambda d Ld - \lambda r Lr$$

In Equation 9, Lcls may mean a class loss function, Lbox may mean a bounding box loss function, Ld may mean a stereo-focus loss, and Lr may mean a regional classification loss. Also, λcls, λbox, λd, and λr may mean hyperparameters.

Figure 10:
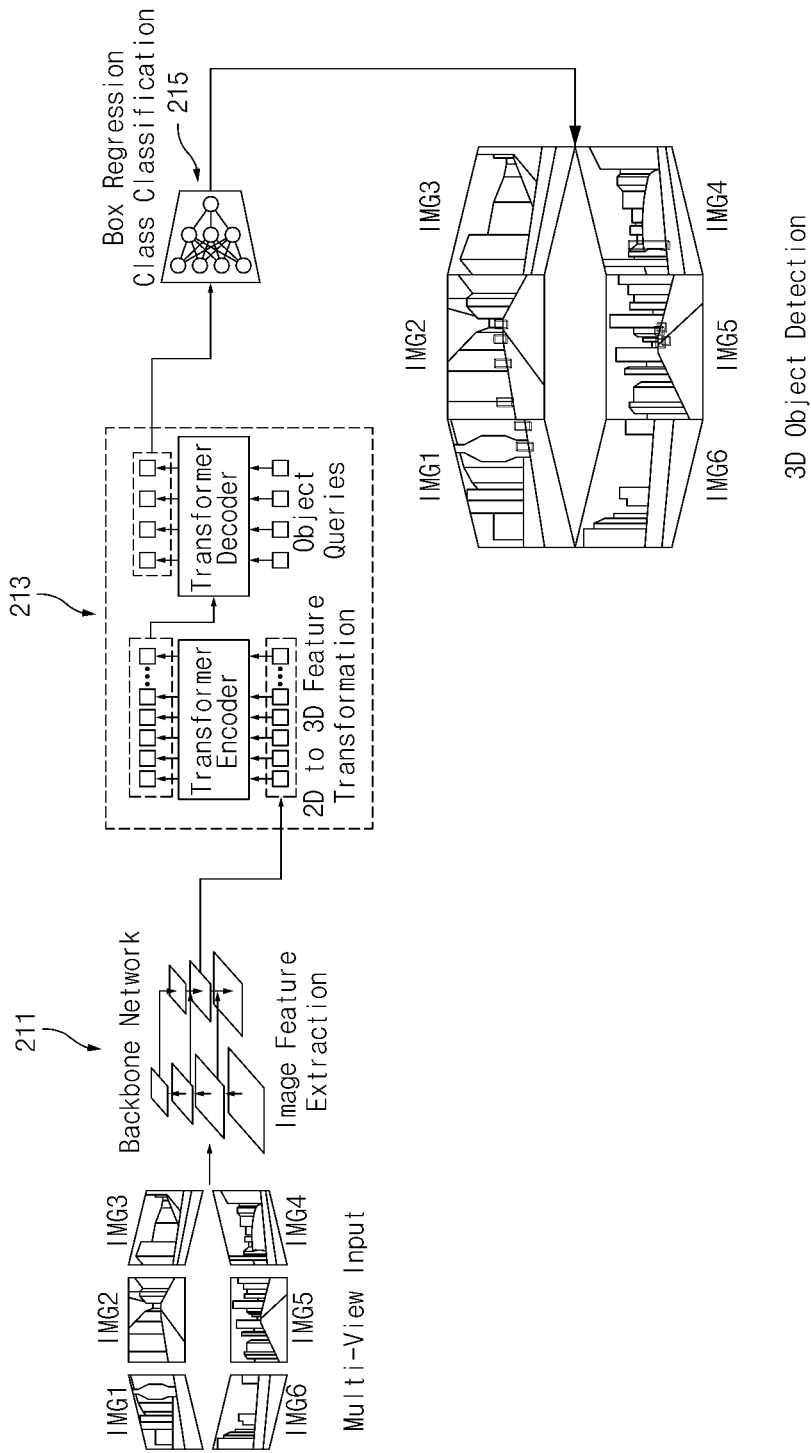
FIG. 10 is a diagram for explaining an object detection process according to an embodiment of the present disclosure.

FIG. 10 is a diagram for explaining an object detection process according to an embodiment of the present disclosure.

Referring to FIG. 10, an object detection process according to an embodiment of the present disclosure may include a procedure in which the backbone network 211 outputs a feature value by using an input image.

The transformer 213 may output predicted location information and scores based on feature values output from the backbone network 211.

The class classifier 215 may detect an object by using the output of the transformer 213.

Because the object detection network 210 is trained to minimize the stereo focus loss from the stereo matching device 230, it is possible to improve the degradation of object detection performance due to depth value deviation in the overlapping region.

In addition, because the object detection network 210 is trained to minimize the region classification loss from the feature vector determination device 240, it is possible to improve the object classification accuracy in the overlapping region.

In addition, as shown in FIG. 10, the object detection process may not involve operations of the overlapping region detection device 220, the stereo matching device 230, and the feature vector determination device 240. Accordingly, the object detection network 210 may improve object detection performance while maintaining the existing object detection speed.

Hereinafter, object detection performance using an apparatus for detecting an object according to an embodiment of the present disclosure is described.

Table 1 and Table 2 below indicate object detection performance evaluation and are tables showing experimental results using nuScenes validation/test data. NDS and mAPs are evaluation index parameters and are indicators indicating that object detection performance is good where the values are higher.

TABLE 1

| Model | Mono/Multi | Backbone | NDS | mAP |
|---|---|---|---|---|
| CenterNet [53] | Mono | DLA34 | 0.328 | 0.306 |
| FCOS3D [44] | Mono | ResNet101 | 0.415 | 0.343 |
| PGD [43] | Mono | ResNet101 | 0.428 | 0.369 |
| DETR3D [47] | Multi | ResNet101 | 0.425 | 0.346 |
| DETR3D † [47] | Multi | ResNet101 | 0.434 | 0.349 |
| OURS | Multi | ResNet101 | 0.441 | 0.364 |

TABLE 2

| Model | Mono/Multi | Backbone | NDS | mAP |
|---|---|---|---|---|
| FCOS3D [44] | Mono | ResNet101 | 0.428 | 0.358 |
| PGD [43] | Mono | ResNet101 | 0.448 | 0.386 |
| DD3D*[31] | Mono | V2-99 | 0.477 | 0.418 |
| DETR3D ‡[47] | Multi | V2-99 | 0.479 | 0.412 |
| BEVDet ‡ [47] | Multi | V2-99 | 0.482 | 0.422 |
| OURS ‡ | Multi | V2-99 | 0.489 | 0.423 |

In Table 1 and Table 2, 'Ours' indicates the experimental results according to an embodiment of the present disclosure.

As shown in Table 1 and Table 2, it may be identified that object detection performance according to an embodiment of the present disclosure exhibits high performance compared to other object detection models.

Table 3 below shows the object detection performance (AP) for each class compared to the DETR3D model and is a table showing the experimental results using nuScenes validation/test data.

TABLE 3

| Model | Car | Truck | Bus | Trailer | C.V | Ped |
|---|---|---|---|---|---|---|
| DETR3D [47] | 0.603 | 0.333 | 0.290 | 0.358 | 0.170 | 0.455 |
| OURS | 0.609 | 0.338 | 0.323 | 0.347 | 0.174 | 0.467 |
| Model | Motor | Bicycle | T.c | Barrier | mAP | |
| DETR3D [47] | 0.413 | 0.308 | 0.627 | 0.565 | 0.412 | |
| OURS | 0.420 | 0.311 | 0.649 | 0.589 | 0.423 | |

In Table 3, "C.V" may mean a construction vehicle, "Motor" may mean a motorcycle, and "T.C" may mean a traffic cone.

As illustrated in Table 3, it may be identified that the object detection performance (AP) of the object detection model according to an embodiment of the present disclosure is higher than that of the DETR3D model.

Table 4 below illustrates the object detection performance AP for each class compared to the DETR3D model in the overlapping region, and is a table illustrating the experimental results using nuScenes validation/test data. In Table 4, mATE, mASE, mAOE, mAVE, and mAAE may mean evaluation index parameters, respectively, mATE may mean an average translation error, mASE may mean an average scale error, mAOE may mean an average orientation error, mAVE may mean an average velocity error, and mAAE may mean an average attribute error. The lower mATE, mASE, mAOE, mAVE, and mAAE may be indicators indicating better object detection performance.

TABLE 4

| Model | Mono/Multi | NDS | mAP | mATE |
|---|---|---|---|---|
| FCOS3D [41] | Mono | 0.317 | 0.213 | 0.841 |
| DETR3D [44] | Multi | 0.356 | 0.231 | 0.825 |
| OURS | Multi | 0.405 | 0.261 | 0.676 |

| Model | mASE | mAOE | mAVE | mAAE |
|---|---|---|---|---|
| FCOS3D [41] | 0.604 | 1.122 | 0.173 | |
| DETR3D [44] | 0.400 | 0.863 | 0.223 | |
| OURS | 0.364 | 0.751 | 0.183 | |

As shown in Table 4, it may be identified that the object detection performance AP of the object detection model according to an embodiment of the present disclosure is higher than that of the DETR3D model in the overlapping region.

Figure 11:
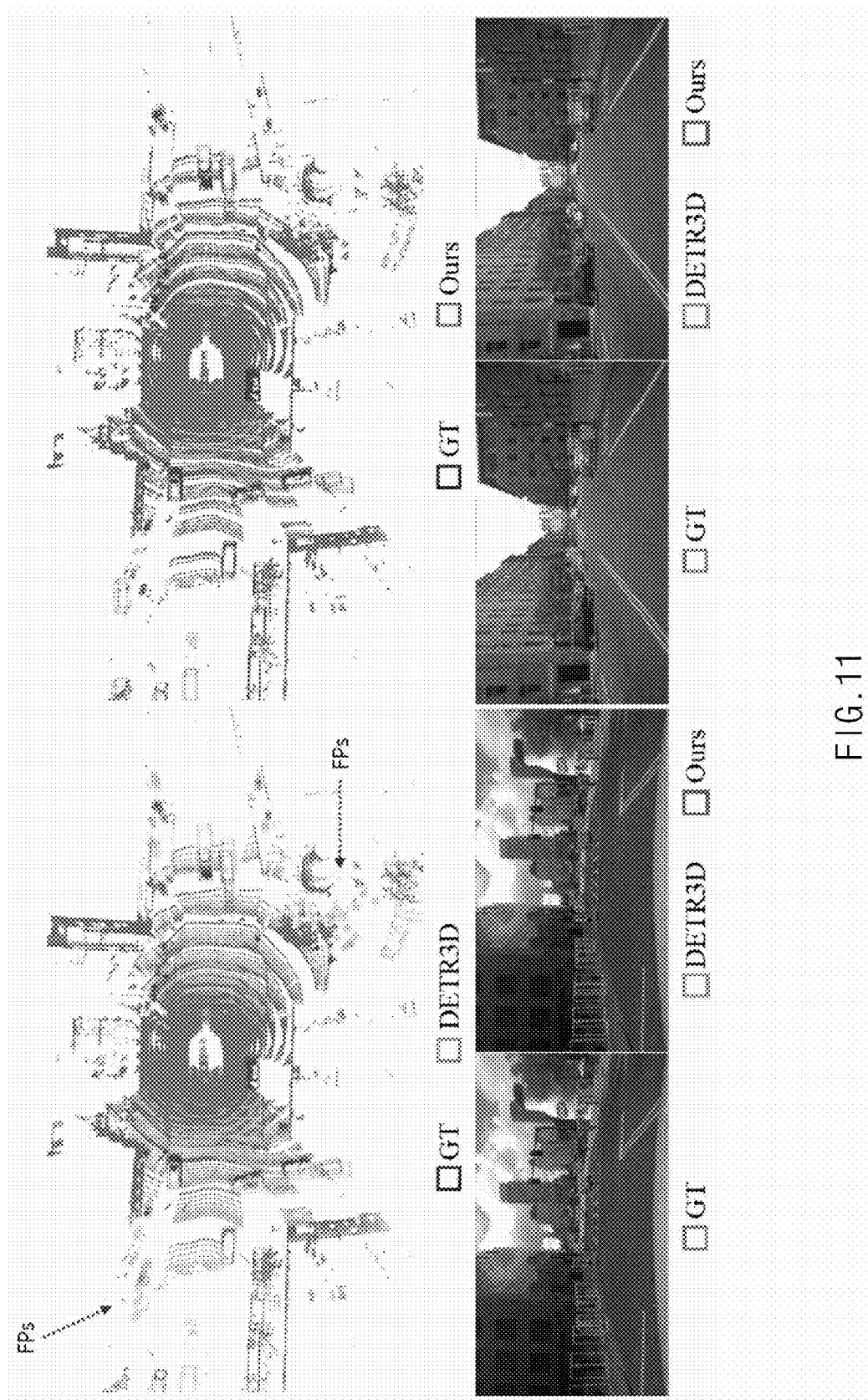
FIGS. 11-13 are diagrams illustrating performance of an object detection model according to an embodiment of the present disclosure.
Figure 12:
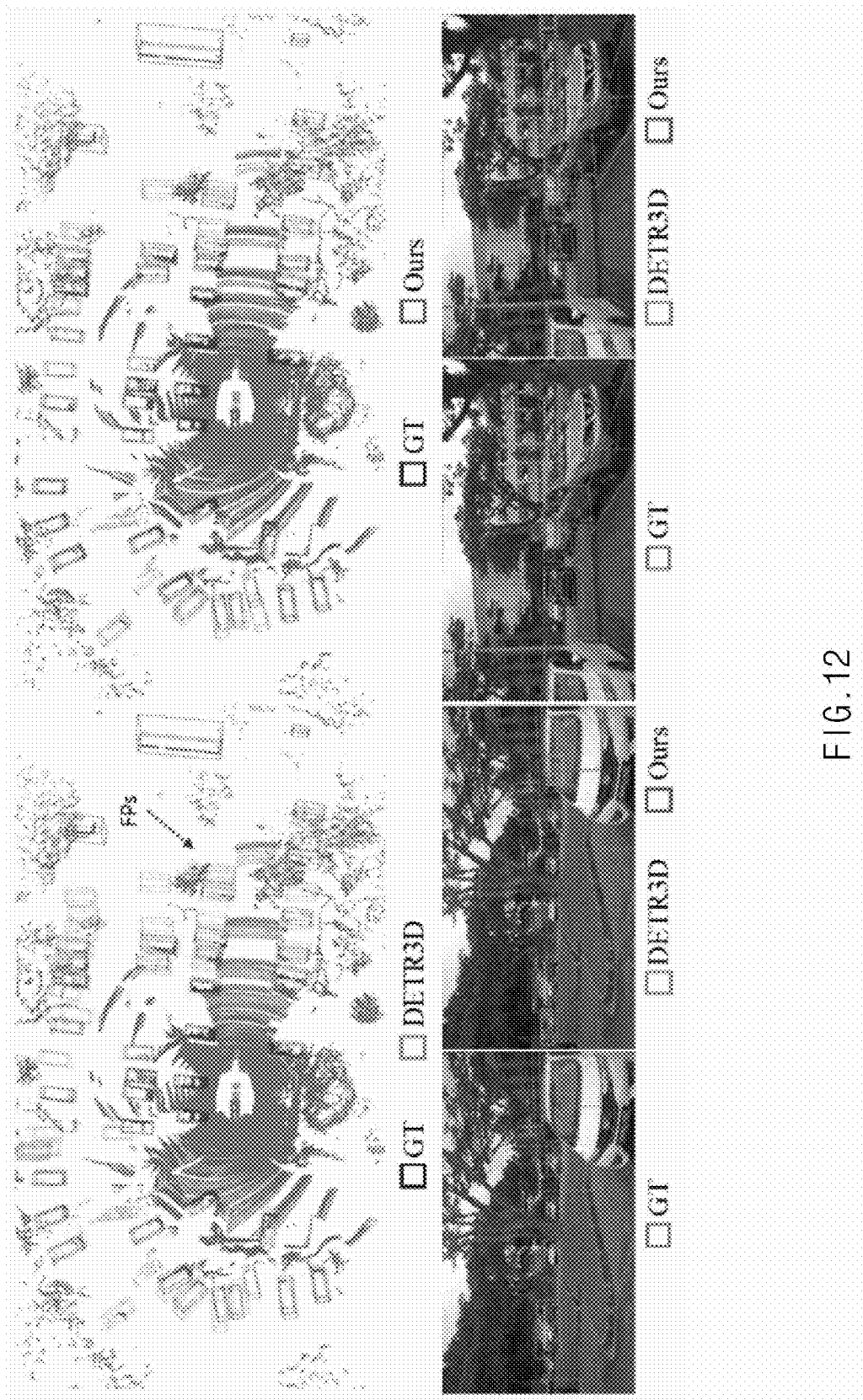

FIGS. 11 and 12 are diagrams illustrating test results of object detection performance according to an embodiment of the present disclosure. In FIGS. 11 and 12, "GT" may mean measured data, "DETR3D" may mean an object detection model according to a comparative example, and "Ours" may mean an object detection model according to an embodiment of the present disclosure.

As identified in FIGS. 11 and 12, it may be identified that the performance of the object detection model according to an embodiment of the present disclosure is greatly improved in the overlapping region.

Figure 13:
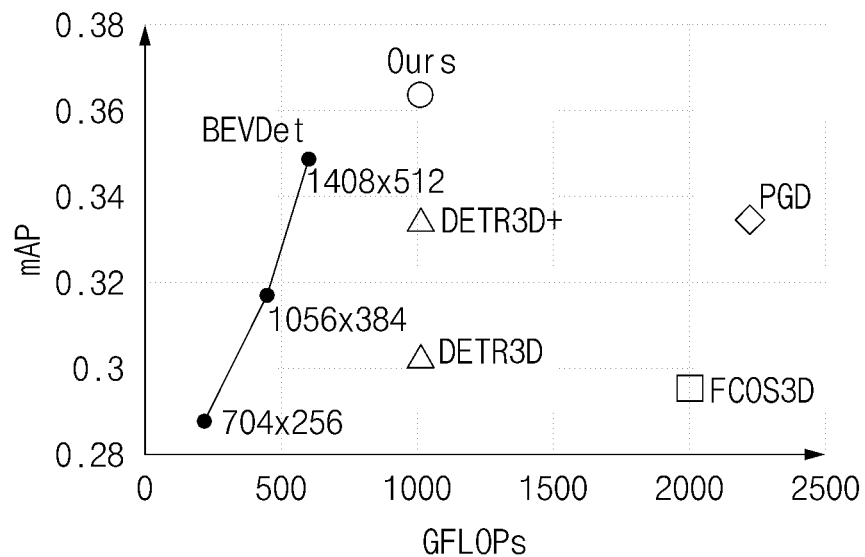
Figure 13:
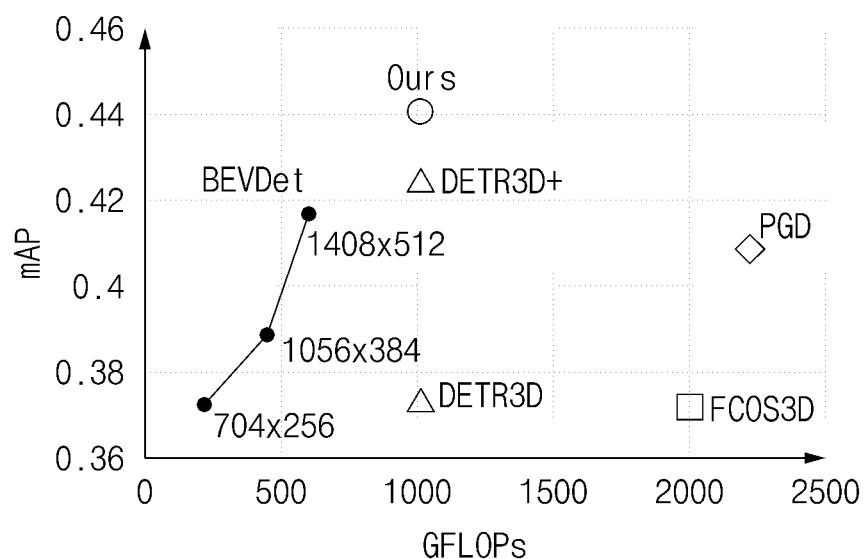

FIG. 13 is a diagram illustrating object detection performance according to an embodiment of the present disclosure.

As understood in FIG. 13, according to an embodiment of the present disclosure, mAP and NDS indicators are high while maintaining the same detection speed as the DETR3D model.

In addition, according to an embodiment of the present disclosure, it may be identified that both object detection speed and object detection performance are improved compared to the BEVDet model.

Figure 14:
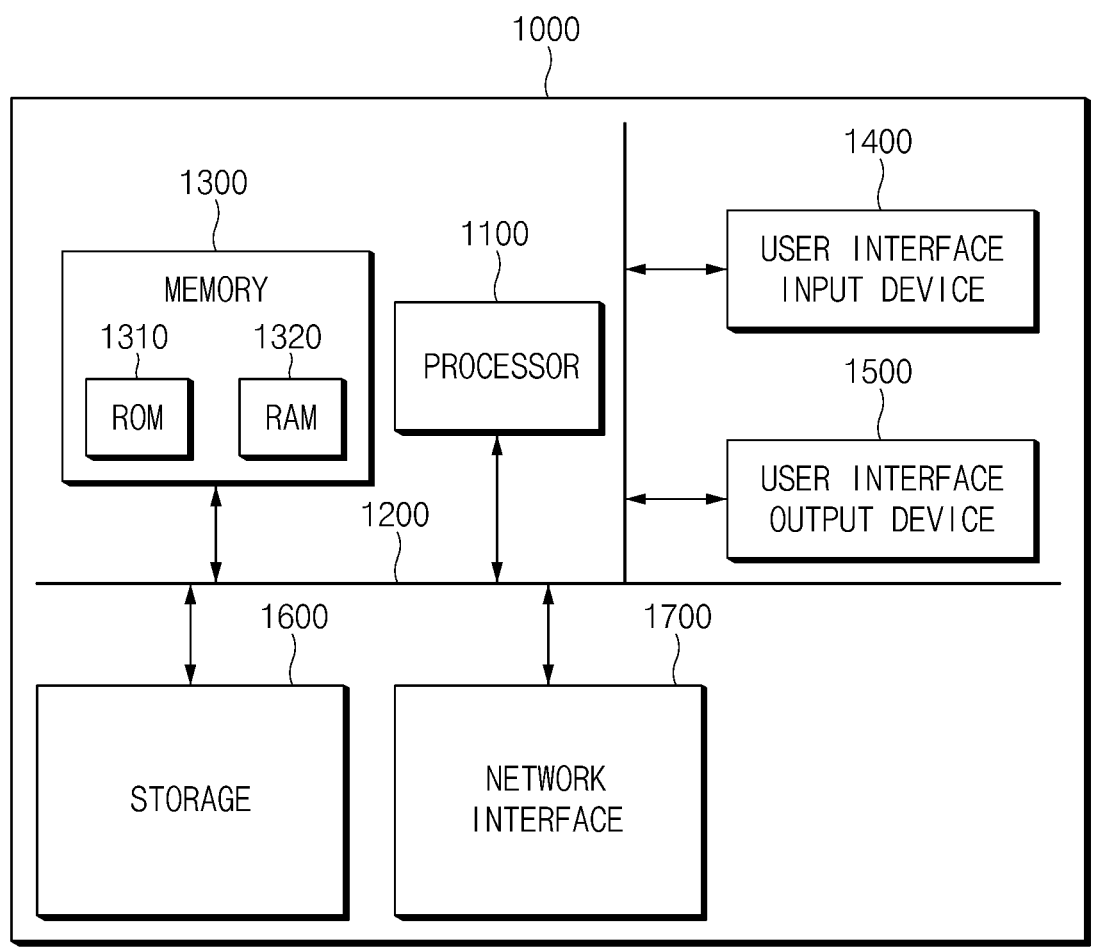
FIG. 14 is a block diagram illustrating a computing system according to an embodiment of the present disclosure.

FIG. 14 is a block diagram illustrating a computing system according to an embodiment of the present disclosure.

Referring to FIG. 14, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) and a Random-Access Memory (RAM).

Accordingly, the processes of the method or algorithm described in relation to embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an erasable programmable read-only memory (EPROM), an electrically-erasable programmable read-only memory (EEPROM), a register, a hard disk, solid state drive (SSD), a detachable disk, or a compact-disk ROM (CD-ROM).

The storage medium is coupled to the processor 1100 and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus and method for detecting an object, and the computer readable recording medium therefor according to embodiments of the present disclosure, it is possible to improve the deviation of the depth value through stereo matching of overlapping regions of images obtained through different cameras.

In addition, according to the apparatus and method for detecting an object, and the computer readable recording medium therefor according to embodiments of the present disclosure, it is possible to improve object detection performance in the overlapping region by allowing the object detection network to detect objects in the overlapping region under the same conditions as objects in the non-overlapping region through the adversarial learning device.

In addition, according to the apparatus and method for detecting an object, and the computer readable recording medium therefor according to embodiments of the present disclosure, after training is completed, object detection may be performed using only the object detection network without using the overlapping region detection device, stereo matching device, and adversarial learning device, so that it is possible to improve the object detection performance and object detection speed.

In addition, various effects that are directly or indirectly understood through the present disclosure may be provided.

Although embodiments of the present disclosure have been described for illustrative purposes, those having ordinary skill in the art appreciate that various modifications, additions, and substitutions are possible, without departing from the scope and spirit of the disclosure.

Therefore, the embodiments disclosed in the present disclosure are provided for the sake of description, not limiting the technical concepts of the present disclosure. It should be understood that such embodiments are not intended to limit the scope of the technical concepts of the present disclosure. The scope of protection of the present disclosure should be understood by the claims below, and all the technical concepts within the equivalent scopes should be interpreted to be within the scope of the right of the present disclosure.

What is claimed is:

1. An apparatus for detecting an object, the apparatus comprising:
a first camera configured to obtain a first image of a first view angle range;
a second camera configured to obtain a second image of a second view angle range having an overlapping region with the first view angle range;
an object detection network configured to detect an object in the first image and the second image;
a stereo matching device configured to correct a deviation of a depth value between the first image and the second image in the overlapping region based on a feature value output by a backbone network of the object detection network; and
a feature vector determination device configured to perform adversarial learning to reduce a deviation of a feature vector between an object in the overlapping region and an object in a non-overlapping region while the object detection network detects the object.

2. The apparatus of claim 1, wherein the stereo matching device is configured to correct the deviation of the depth value by reducing a deviation between a predicted disparity map and a ground truth disparity map in the overlapping region.

3. The apparatus of claim 2, wherein the stereo matching device is configured to:
generate a matched feature value by matching a first image feature value of the first image and a second image feature value of the second image output by the backbone network of the object detection network;
obtain multi-scale feature values for the matched feature value by using a multi-scale layer; and
generate a cost volume based on the multi-scale feature values.

4. The apparatus of claim 3, wherein the stereo matching device is configured to obtain a stereo focus loss corresponding to a deviation between the cost volume and the ground truth disparity map, and wherein the object detection network is configured to learn an object detection model to reduce the stereo focus loss.

5. The apparatus of claim 4, wherein the feature vector determination device is configured to output a regional classification loss proportional to a deviation of the feature vector based on the feature vector provided from the object detection network.

6. The apparatus of claim 5, wherein the object detection network includes:
a transformer configured to output prediction location information and score information of the object based on the feature value output from the backbone network; and
a class classifier configured to output a bounding box loss and a class loss based on the prediction location information, the score information, and the regional classification loss.

7. The apparatus of claim 6, wherein the object detection network is configured to perform learning to reduce the regional classification loss output from the feature vector determination device.

8. The apparatus of claim 7, wherein the object detection network is configured to
perform the learning to reduce a total loss obtained by subtracting the regional classification loss from a sum of the bounding box loss, the class loss, and the stereo focus loss.

9. A method of detecting an object, the method comprising:
extracting, by overlapping region detection device, an overlapping region between a first image captured by a first camera and a second image captured by a second camera;
correcting, by a stereo matching device, a deviation of a depth value between the first image and the second image in the overlapping region while an object is detected in the first image and the second image by using an object detection network; and
performing, by a feature vector determination device, adversarial learning to reduce a feature vector deviation between objects in the overlapping region and an non-overlapping region.

10. The method of claim 9, wherein correcting the deviation of the depth value includes:
obtaining a predicted disparity map in the overlapping region; and
reducing a deviation between the predicted disparity map and a ground truth disparity map.

11. The method of claim 10, wherein obtaining the predicted disparity map includes:
generating a matched feature value by matching a first image feature value of the first image and a second image feature value of the second image output from a backbone network of the object detection network;
obtaining multi-scale feature values for the matched feature value by using a multi-scale layer; and
generating a cost volume based on the multi-scale feature values.

12. The method of claim 11, wherein correcting the depth value further includes:
obtaining a stereo focus loss corresponding to a deviation between the cost volume and the ground truth disparity map; and
learning an object detection model to reduce the stereo focus loss.

13. The method of claim 12, wherein performing the adversarial learning further includes outputting a regional classification loss proportional to a deviation of the feature vector based on the feature vector provided from the object detection network.

14. The method of claim 13, wherein performing the adversarial learning further includes providing, by a network, the regional classification loss to a class classifier that outputs a bounding box loss and a class loss.

15. The method of claim 14, wherein performing the adversarial learning further includes learning the object detection network to reduce the regional classification loss.

16. The method of claim 9, wherein extracting the overlapping region includes obtaining 4D information including the depth value based on 2D information extracted from the first image and the second image.

17. A computer readable recording medium that stores computer readable instructions for performing operations, wherein the operations include:
extracting an overlapping region between a first image captured by a first camera and a second image captured by a second camera;
correcting a deviation of a depth value between the first image and the second image in the overlapping region; and
performing adversarial learning to reduce a deviation of a feature vector between an object in the overlapping region and an object in a non-overlapping region while an object is detected in the first image and the second image by using an object detection network.

18. The computer readable recording medium of claim 17, wherein correcting the deviation of the depth value includes:
- obtaining, by a backbone network of the object detection network, a predicted disparity map based on a feature value; and
- obtaining a stereo focus loss based on a deviation between the predicted disparity map and a ground truth disparity map.

19. The computer readable recording medium of claim 18, wherein correcting the depth value further includes learning an object detection model to reduce the stereo focus loss.

20. The computer readable recording medium of claim 17, wherein the performing of the adversarial learning includes:
- outputting, by a feature vector determination device, a regional classification loss proportional to a deviation of the feature vector based on the feature vector provided from the object detection network; and
- learning the object detection network to reduce the regional classification loss.

\* \* \* \* \*